(12) United States Patent
Girlando et al.

(10) Patent No.: US 9,071,190 B2
(45) Date of Patent: Jun. 30, 2015

(54) ACTUATION CONTROL AND CONTROL METHOD, PARTICULARLY FOR ELECTRICAL DISCONNECTORS

(75) Inventors: Vincenzo Girlando, Padova (IT); Moreno Pivato, San Dona'di Piave (IT); Eros Stella, Roncade (IT)

(73) Assignee: ALSTOM TECHNOLOGY LTD (CH)

( * ) Notice: Subject to any disclaimer, the term of this patent is extended or adjusted under 35 U.S.C. 154(b) by 0 days.

(21) Appl. No.: 13/983,695

(22) PCT Filed: Feb. 4, 2011

(86) PCT No.: PCT/IT2011/000029
§ 371 (c)(1),
(2), (4) Date: Aug. 5, 2013

(87) PCT Pub. No.: WO2012/104880
PCT Pub. Date: Aug. 9, 2012

(65) Prior Publication Data
US 2013/0307439 A1    Nov. 21, 2013

(51) Int. Cl.
| | | |
|---|---|---|
| F04D 15/00 | (2006.01) | |
| H02K 7/14 | (2006.01) | |
| H02P 31/00 | (2006.01) | |
| H01H 11/00 | (2006.01) | |
| H01H 31/34 | (2006.01) | |
| H01H 33/59 | (2006.01) | |
| H02H 7/22 | (2006.01) | |
| H01H 33/36 | (2006.01) | |

(52) U.S. Cl.
CPC .......... *H02P 31/00* (2013.01); *H01H 11/0062* (2013.01); *H01H 31/34* (2013.01); *H01H 33/59* (2013.01); *H01H 2300/03* (2013.01); *H02H 7/222* (2013.01); *H01H 33/36* (2013.01); *Y04S 20/14* (2013.01); *Y02B 70/3241* (2013.01); *Y02B 90/224* (2013.01); *Y04S 20/227* (2013.01)

(58) Field of Classification Search
CPC ......... H01H 53/00; H01H 69/00; H01H 3/26; B04B 13/003
USPC ............................................................ 318/3
See application file for complete search history.

(56) References Cited

U.S. PATENT DOCUMENTS

| | | |
|---|---|---|
| 5,638,296 A | 6/1997 | Johnson et al. |
| 6,215,263 B1 | 4/2001 | Berkowitz et al. |
| 2009/0256427 A1 | 10/2009 | Lalonge |

FOREIGN PATENT DOCUMENTS

EP     0974993 A2    1/2000

OTHER PUBLICATIONS

International Search Report for corresponding application PCT/IT2011/000029 filed Feb. 4, 2011; Mail date Nov. 2, 2011.
Written Opinion for corresponding application PCT/IT2011/000029 filed Feb. 4, 2011; Mail date Nov. 2, 2011.

*Primary Examiner* — Erick Glass
(74) *Attorney, Agent, or Firm* — Cantor Colburn LLP

(57) ABSTRACT

An actuation control, for electrical disconnectors, including a device for driving the actuation motor of a movable element of an electrical disconnector, elements for detecting operating parameters of the disconnector, a device for processing the operating and control parameters of the driving device, elements for storing the operating parameters, which are connected to the processing and control device in order to receive from it and store the processed operating parameters, and interface elements of the actuation control, for its activation for opening or closing the disconnector.

11 Claims, 2 Drawing Sheets

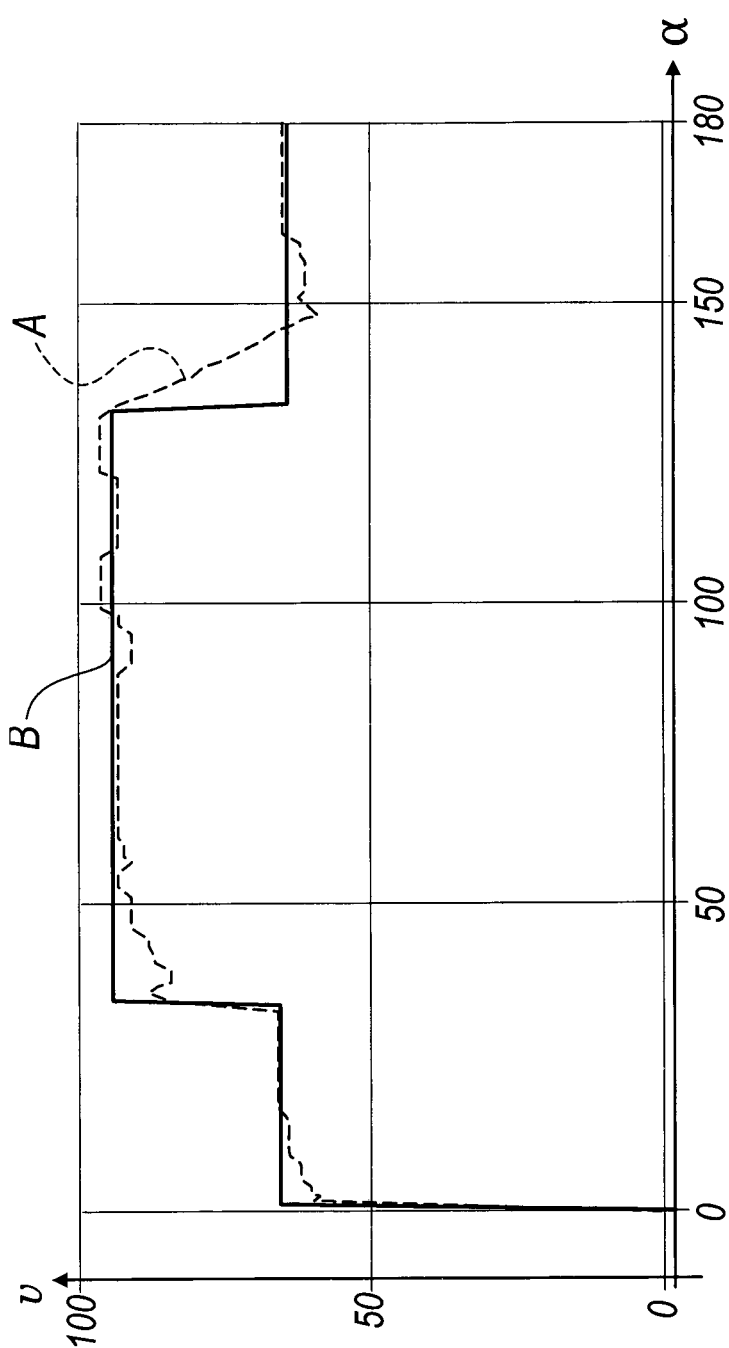

ACTUATION CONTROL AND CONTROL METHOD, PARTICULARLY FOR ELECTRICAL DISCONNECTORS

TECHNICAL FIELD

The present invention relates to an actuation control and the control method particularly for electrical disconnectors.

BACKGROUND ART

Currently, in the field of electrical disconnectors, the need is felt to have solutions that make it possible to obtain fast and efficient actuations of the disconnectors.

The actuation of a disconnector, indeed, provides for the movement of a mechanical element, which in general comprises one or two arms which support respective electrical contacts.

This movement is actuated by an electric motor that moves the mechanical element reversibly between a disconnector closure position, in which the electrical contacts supported by the movable element are mated with corresponding electrical contacts supported by a fixed structure, and an open position, in which the mechanical element is moved so that the electrical contacts are mutually uncoupled and spaced apart so as to disconnect the electrical line to which they belong.

In order to ensure fast and controlled actuation in opening and closure and at the same time a long lifespan of the electric motor and of the electromechanical components of the disconnector, the power supply of the motor, and therefore the actuation torque that it applies to the movable element, must be proportional to the operating conditions.

In particular, for example, the presence of snow or ice, which weigh down on the mechanical element and can cover the contacts, when they are open, can greatly affect the torque and power required of the motor in order to achieve an efficient closing or opening of the disconnector.

In addition to the presence of snow and ice, environmental conditions in general, such as for example high winds and/or rain or hail, the temperature, be it very high or very low, and humidity heavily influence the operation of the disconnector.

Disconnectors make up key components for safety in line management and for ensuring their efficiency, and therefore not only do customers strongly require them to be highly efficient, but in the field of electrical line management the need to allow their predictable rapid and effective maintenance is also strongly felt.

Therefore in this field the need is strongly felt to have actuation controls for disconnectors that make it possible to promptly identify their malfunction, or malfunction symptoms, while also making it possible to formulate reliable hypotheses as to the causes of these symptoms or of this malfunction, in order to allow effective and targeted interventions for maintenance, including predictive maintenance.

DISCLOSURE OF THE INVENTION

The aim of the present invention is to provide an actuation control, particularly for disconnectors, and its control method, which make it possible to meet the described requirements, while making it possible at the same time to actuate the disconnector in the most efficient manner as a function of the environmental conditions, while also monitoring its operation in order to allow effective diagnostics thereof in the event of anomalies.

Within this aim, an object of the invention is to provide an actuation control that makes it possible to detect operating anomalies of the disconnector.

Another object of the invention is to provide an actuation control that makes it possible to provide context for any operating anomalies of the disconnector at an instant in time and according to the contingent environmental conditions in which the anomaly, if any, has occurred, in order to allow effective diagnosis thereof.

A further object of the invention is to provide an actuation control that allows remote diagnosis of the operation of the disconnector.

Another object of the invention is to provide an actuation control that is structurally simple and easy to use and which can be manufactured at low cost.

This aim, as well as these objects and others that will become better apparent hereinafter, are achieved by an actuation control, particularly for electrical disconnectors, characterized in that it comprises a device for driving the actuation motor of a movable element of an electrical disconnector or the like, adapted to execute a program for driving said movable element, means for detecting operating parameters of said disconnector, a device for processing said operating and control parameters of said driving device, to which it is connected in order to control it in emergency situations, according to an emergency driving program to be executed instead of a preset ordinary driving program, said emergency situations being defined by the acquisition, by at least one of said operating parameters, of a value that exceeds a predefined threshold value, means for storing said operating parameters, which are connected to said processing and control device in order to receive from it and store said processed operating parameters, interface means of said actuation control, for its activation for opening or closing said disconnector, said operating parameters comprising at least first operating parameters for the operation of said movable element, which comprise at least the speed of motion of said movable element and its position between a closed disconnector position and an open disconnector position, second operating parameters for the operation of said motor, which comprise the intensity of the current absorbed by said motor and the trend of the voltage supplied to it, time parameters comprising the date and time of day, and environmental parameters.

Furthermore, this aim, as well as these objects and others that will become better apparent hereinafter, are achieved by a method for actuation control, particularly for electrical disconnectors, characterized in that it consists in detecting operating parameters of said disconnector, processing said operating parameters and, in emergency situations, controlling a driving device of said disconnector according to an emergency driving program to be executed instead of a preset ordinary driving program that otherwise said driving device executes, said emergency situations being defined by the acquisition, by at least one of said operating parameters, of a value that exceeds a predefined threshold value, storing said operating parameters, including any processed ones, said operating parameters comprising at least first operating parameters for the operation of a movable element of said disconnector, comprising at least the speed of motion of said movable element and its position between a closed disconnector position and an open disconnector position, second operating parameters for the operation of the actuation motor of said movable element, which comprise the intensity of the current absorbed by said motor and the trend of the voltage supplied to it, time parameters, comprising the date and time of day, and environmental parameters.

BRIEF DESCRIPTION OF THE DRAWINGS

Further characteristics and advantages of the invention will become better apparent from the description of a preferred but not exclusive embodiment of the actuation control according to the invention, illustrated by way of non-limiting example in the accompanying drawings, wherein:

FIG. 2 is a chart that plots operating parameters of a disconnector equipped with an actuation control according to the invention.

WAYS OF CARRYING OUT THE INVENTION

Figure 1:
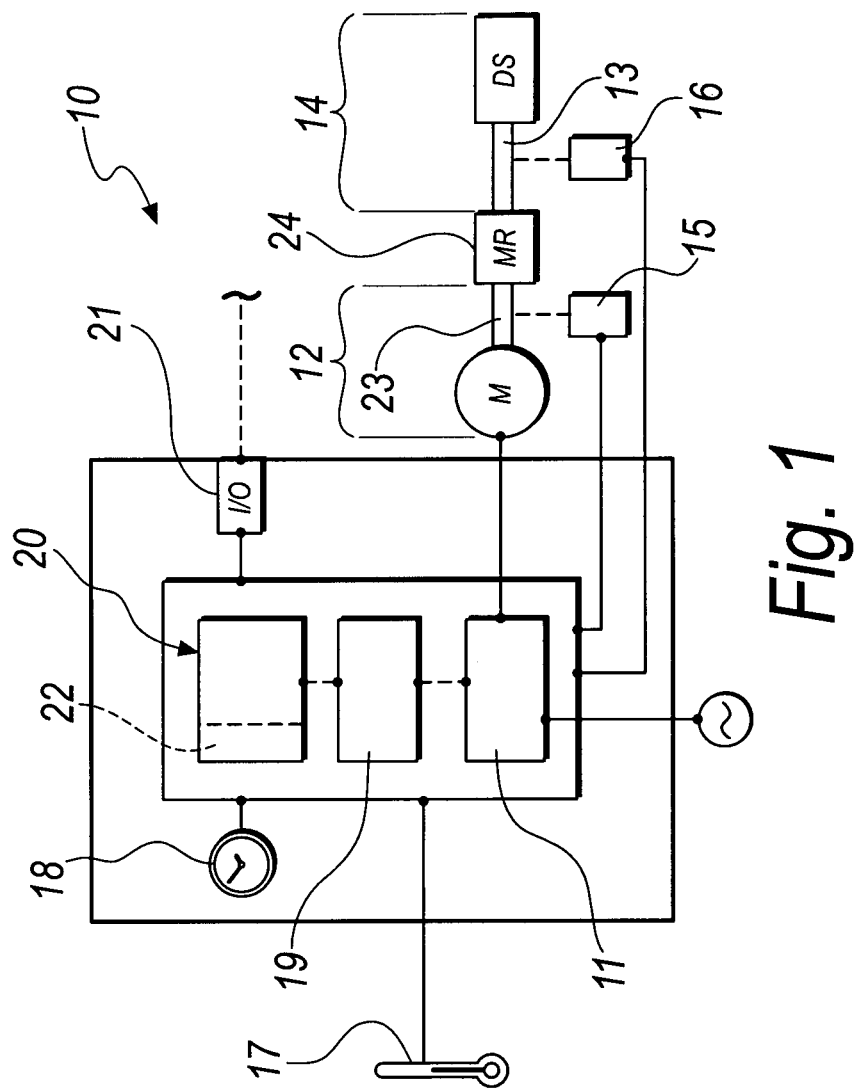
FIG. 1 is a simplified diagram of an actuation control according to the invention.

With reference to the figures, the reference numeral 10 generally designates an actuation control, particularly for electrical disconnectors, which according to the invention has a distinctive characteristic in that it comprises a device 11 for driving the motor 12, which is electric and conveniently of the direct-current type, adapted to actuate a movable element 13 of a disconnector 14 or the like, the driving device being adapted to execute a program for driving the movable element 13, means 15, 16, 17 and 18 for detecting operating parameters of the disconnector 14, a device for processing said operating and control parameters of the driving device 11, generally designated by the reference numeral 19, which is connected to the driving device 11 in order to control it in emergency situations, according to an emergency driving program to be executed instead of a preset ordinary driving program, said emergency situations being defined by the acquisition, by at least one of said operating parameters, of a value that exceeds a predefined threshold value, means 20 for storing said operating parameters, which are connected to the processing and control device 19 in order to receive from it and store said processed operating parameters, means 21 for interfacing the actuation control 10, for its activation for opening or closing the disconnector 14, by an operator.

According to the invention, the operating parameters comprise first operating parameters of the operation of the movable element 13, which comprise the speed of motion of the movable element 13 and its position between a closed disconnector position and an open disconnector position, second operating parameters of the operation of the motor 12, which comprise the intensity of the current absorbed by the motor 12 and the trend of the voltage supplied to it, time parameters comprising the date and time of day, and environmental parameters.

Advantageously, the operating parameters comprise an index of reliability of actuation of the disconnector 14, which is calculated according to a predefined algorithm of further operating parameters which are previously chosen from among said operating parameters.

In this manner, at least one of the emergency situations is conveniently defined by the acquisition, by said reliability index, of a value that exceeds a predefined limit value for said index.

In alternative embodiments of the invention, the operating parameters can comprise parameters which are additional to the ones listed here according to the contingent requirements; thus, furthermore, the first operating parameters can comprise parameters which are additional to the speed of motion and said position.

Preferably, the actuation control 10 furthermore comprises a memory 22, which is conveniently integrated in the storage means 20 and comprises a plurality of driving programs for the preselection, by the operator, of the ordinary driving program chosen from the plurality of driving programs as a function of the type and operating conditions of a disconnector 14 for the actuation of which the actuation control 10 is installed.

Advantageously, the driving programs define the trend of the movement speed of the movable element 13 as a function of its position between an open disconnector position and a closed disconnector position, as shown by way of non-limiting example in FIG. 2, where the trend is shown in solid lines and designated by the reference letter B, the angle of rotation of the movable element 13 between the open position, which corresponds to the value 0° of the angle, to the closed position, which corresponds to the value 180° of the angle, being indicated on the abscissa.

FIG. 2 also illustrates by way of non-limiting example an exemplifying trend of the speed of motion of the movable element 13 of the disconnector 14, which is shown therein in dashed lines and designated by the reference letter A.

The driving device 11 conveniently drives the motor 12 by means of modulation of the length of the pulse of the voltage of the power supply of the motor 12 in a manner which is per se known as the PWM control method, the acronym standing for "pulse width modulation".

Such second operating parameters advantageously comprise the length of the pulse of the power supply voltage of the motor 12, which is set by the driving device 11 during the actuation of the disconnector 14.

Preferably, the detection means 15, 16, 17, 18 comprise an angular position transducer 15, better known by the name "encoder", which is connected to the rotating element 23 of the motor 12 in order to detect its angular position, the detected angular position being conveniently one of the first operating parameters.

The rotating element 23 of the motor 12 is conveniently connected to the movable element 13 of the disconnector 14 by means of a mechanical reduction unit 24.

Furthermore, the detection means 15, 16, 17, 18 conveniently also comprise stroke limiting sensors 16, which are installed on the movable element 13 in order to detect when, alternately, it is in the closed disconnector position or in the open disconnector position.

In preferred but not exclusive embodiments of the invention, conveniently the detection means also comprise means for detecting the compliance with the correct power supply polarity of the motor 12, in order to prevent any incorrect reversal of its direction of rotation with respect to a command to open or close the disconnector 14, which would prevent the correct operation of the stroke limiting sensors 16.

The detection means 15, 16, 17, 18 advantageously comprise a thermometer 17 for measuring the temperature of the installation environment of the actuation control 10, the environmental parameters comprising said temperature.

The detection means 15, 16, 17, 18 also comprise a timer 18 for calculating the date and time of day.

Thus, the movement speed of the movable element 13 of the disconnector 14 is conveniently calculated by the processing and control device 19 from the motion of the rotating element 23 detected by the angular position transducer 15, in the detection time interval calculated by the timer 18.

The processing and control device 19 furthermore preferably calculates the difference between the calculated movement speed and the speed of motion, defined by the driving program that the driving device 11 executes.

Such difference in speed conveniently is part of the operating parameters and is stored by the storage means 20.

According to the invention, a method for actuation control, particularly for electrical disconnectors, has a distinctive characteristic in that it consists in detecting operating parameters of the disconnector 14, conveniently by virtue of the detection means 15, 16, 17, 18, processing the operating parameters and, in emergency situations, controlling a driving device 11 of the disconnector 14, according to an emergency driving program to be executed instead of a preset ordinary driving program that otherwise the driving device 11 executes, the emergency situations being defined by the acquisition, by at least one of the operating parameters, of a value that exceeds a predefined threshold value, storing the operating parameters, including any processed ones.

According to the invention, the operating parameters comprise at least first operating parameters for the operation of a movable element 13 of the disconnector 14, comprising at least the speed of motion of the movable element 13 and its position between a closed disconnector position and an open disconnector position, second operating parameters for the operation of the motor 12 for actuating the movable element 13, which comprise the intensity of the current absorbed by the motor 12 and the trend of the voltage supplied to it, time parameters, comprising date and time of day, and environmental parameters.

The operation of an actuation control 10 according to the invention is as follows.

When the actuation control 10 is designed to be installed in order to control the actuation of a disconnector 14, the ordinary driving program is selected by choosing it from the plurality of driving programs available in the memory 22.

This choice is made as a function of the type and of the operating conditions expected for the disconnector 14, for the actuation of which the actuation control 10 is installed.

During use, by virtue of the interface means 21 the actuation control 10 receives orders to open and close the disconnector 14.

These orders start the execution of the ordinary driving program, respectively for opening or closing the disconnector 14.

The processing and control device 19 advantageously is programmed to control the driving device to execute alternative emergency driving programs, instead of the ordinary driving program, when the emergency situations, which are defined by the acquisition, by at least one of the operating parameters, of a value that exceeds a preset threshold value, occur.

In particular, the processing and control device 19 is conveniently programmed to identify a plurality of emergency situations, which correspond to the acquisition of values beyond threshold limits by respective parameters among said operating parameters.

Thus, for example, the processing and control device 19 is programmed to calculate the movement speed, calculate the difference between the movement speed and the motion speed defined by the driving program being executed, compare the difference with a threshold value for the difference, command the driving device to execute a first predefined emergency driving program if the value of the difference exceeds the threshold value for the difference.

Such first emergency driving program is predefined so that its execution does not compromise the structural and functional integrity of the disconnector 14 during its execution, on the basis of the causes deemed, during the programming of the processing and control device 19, to be causes for the occurrence of the exceeding of the threshold value.

Likewise, the processing and control device 19 is programmed to command the driving device 11 to execute the alternative emergency driving programs, depending on whether emergency situations occur which are identified by the processing and control device 19 on the basis of the exceeding of a threshold value, alternately or simultaneously, by the value of the current intensity absorbed by the motor 12, the value of the speed of movement of the movable element 13, the value of the torque that opposes the movement of the motor 12, calculated by the processing and control device 19 on the basis of the absorbed current intensity.

For example, if the processing and control device 19 detects an emergency situation constituted by the exceeding of the upper threshold value of the temperature detected by means of the thermometer 17, it commands the driving device 11 to execute a second emergency driving program, which provides, for example, for the halving of the length of the pulse of the power supply voltage of the motor 12 with respect to the length provided by the ordinary driving program for the corresponding position of the movable element 13 of the disconnector 14.

Furthermore, the processing and control device is preferably programmed to detect abnormal operating situations, which are defined by the exceeding of the value acquired by at least one of the operating parameters of respective guard values.

Advantageously, the processing and control device 19 is also programmed to provide the operator, by virtue of the interface means 21, with a notification, such as for example an alarm signal which correspondingly identifies the abnormal situations and/or the emergency situations when it detects them.

Furthermore, by virtue of the interface means 21 the operator can advantageously connect a device for displaying and/or storing the values of the operating parameters which are stored in the storage means 20, or data which are processed in real time by the processing and control device 19.

In practice it has been found that the invention achieves the set aim and objects, by providing an actuation control, particularly for disconnectors, and its control method, which makes it possible at the same time to actuate the disconnector in the most efficient manner as a function of the environmental conditions, while also monitoring its operation in order to allow an efficient diagnosis thereof in the event of anomalies or malfunctions.

An actuation control according to the invention furthermore makes it possible to detect anomalies in operation of the disconnector and furthermore it makes it possible to provide context for any anomalies in the operation of the disconnector at an instant in time and on the basis of the contingent environmental conditions of the occurrence of the anomaly, if any, thus allowing effective diagnosis.

An actuation control according to the invention also allows a remote diagnosis of the operation of the disconnector by virtue of the interface means.

Moreover, an actuation control according to the invention is structurally simple and easy to use and can be manufactured at low cost.

The invention thus conceived is susceptible of numerous modifications and variations, all of which are within the scope of the appended claims; all the details may further be replaced with other, technically equivalent elements.

In practice, the materials used, so long as they are compatible with the specific use, as well as the contingent shapes and dimensions, may be any according to requirements and the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. An actuation control for electrical disconnectors, comprising:
   a device for driving the actuation motor of a movable element of an electrical disconnector, adapted to execute a program for driving said movable element,
   means for detecting operating parameters of said disconnector,
   a device for processing said operating and control parameters of said driving device, to which it is connected in order to control it in emergency situations, according to an emergency driving program to be executed instead of a preset ordinary driving program, said emergency situations being defined by the acquisition, by at least one of said operating parameters, of values that exceed predefined threshold limits,
   said processing and control device being provided with a program suitable to identify a plurality of emergency situations, which correspond to the acquisition of the values beyond threshold limits by respective parameters among said operating parameters,
   means for storing said operating parameters, which are connected to said processing and control device in order to receive from it and store said processed operating parameters,
   interface means of said actuation control, for its activation for opening or closing said disconnector, and
   a memory that comprises a plurality of driving programs for preselection by the operator of said ordinary driving program chosen from said plurality of driving programs as a function of the type and of the operating conditions expected for the disconnector for the control of which said actuation control is installed and alternative emergency driving programs that are predefined on the basis of causes deemed, during programming of said processing and control device, to cause occurrence of the exceeding of said threshold limits,
   said operating parameters comprising at least
   first operating parameters for the operation of said movable element, which comprise at least the speed of motion of said movable element and its position between a closed disconnector position and an open disconnector position,
   second operating parameters for the operation of said motor, which comprise the intensity of the current absorbed by said motor and the trend of the voltage supplied to it,
   time parameters comprising the date and time of day, and environmental parameters,
   wherein
   said program provided in said processing and control device is adapted, in sequence, to:
   calculate the movement speed of said movable element,
   calculate the speed difference between the calculated movement speed and the motion speed defined by the driving program that the driving device is executing,
   compare the calculated speed difference with a threshold limit for the speed difference, and
   command the driving device to execute a first predefined emergency driving program instead of the driving program being executed if the value of the calculated speed difference exceeds the threshold limit for the speed difference.

2. The actuation control according to claim 1, wherein said driving programs define the trend of the speed of movement of said movable element as a function of its position between a closed disconnector position and an open disconnector position.

3. The actuation control according to claim 1, wherein said driving device drives said motor by means of modulation of the length of the pulse of its power supply voltage.

4. The actuation control according to claim 3, wherein said second operating parameters comprise said length of the pulse of the power supply voltage of said motor set by said driving device.

5. The actuation control according to claim 1, wherein said detection means comprise an angular position transducer which is connected to the rotating element of said motor in order to detect its angular position, said detected angular position being comprised in said first operating parameters.

6. The actuation control according to claim 1, wherein said detection means comprise stroke limiting sensors which are installed on said movable element in order to detect when, alternately, it is in said closed disconnector position or in said open disconnector position.

7. The actuation control according to claim 1, wherein said detection means comprise a thermometer for measuring the temperature of the installation environment of said actuation control, said environmental parameters comprising said temperature.

8. The actuation control according to claim 1, wherein said detection means comprise a timer for calculating said date and time of day.

9. A method for actuation control for electrical disconnectors, comprising the steps of:
   detecting operating parameters of said disconnector,
   processing said operating parameters and, in emergency situations, controlling a driving device of said disconnector according to an emergency driving program to be executed instead of a preset ordinary driving program that said driving device otherwise executes, said emergency situations being defined by the acquisition, by at least one of said operating parameters, of values that exceed predefined threshold limits,
   storing said operating parameters, including any processed ones,
   programming a processing and control device of the actuation control to identify a plurality of emergency situations, which correspond to the acquisition of the values beyond said predefined threshold limits by respective parameters among said operating parameters,
   providing in a memory of the actuation control a plurality of driving programs for preselection by the operator of said ordinary driving program chosen from said plurality of driving programs as a function of the type and of the operating conditions of a disconnector for the control of which said actuation control is installed and alternative emergency driving programs that are predefined on the basis of causes deemed, during programming of said processing and control device, to cause occurrence of the exceeding of said threshold limits, said operating parameters comprising at least:

first operating parameters for the operation of a movable element of said disconnector, comprising at least the speed of motion of said movable element and its position between a closed disconnector position and an open disconnector position, second operating parameters for the operation of the actuation motor of said movable element, comprising the intensity of the current absorbed by said motor (12) and the trend of the voltage supplied to it, time parameters comprising date and time of day, and environmental parameters, wherein:

said emergency situations identification step comprises the step sequence for:

calculating the movement speed of said movable element, calculating the speed difference between the calculated movement speed and the motion speed defined by the driving program that the driving device is executing, and comparing the calculated speed difference with a threshold limit for the speed difference, and in that said processing and control device is further programmed to command the driving device to execute a first predefined emergency driving program instead of the driving program being executed if the value of the calculated speed difference exceeds the threshold limit for the difference.

10. The method according to claim 9, wherein said movement speed of the movable element is calculated by the processing and control device from the motion of the rotating element detected by the angular position transducer, in the detection time interval calculated by the timer.

11. The method according to claim 9, wherein the processing and control device is programmed to command the driving device to execute alternative emergency driving programs, depending on whether emergency situations occur which are identified by said processing and control device on the basis of the exceeding of a threshold value, alternately or simultaneously, by:

the value of the current intensity absorbed by said motor, the value of the speed of movement of said movable element, the value of the torque that opposes the movement of the motor, calculated by the processing and control device on the basis of the absorbed current intensity, the value of the temperature detected by means of the thermometer.

* * * * *